Sept. 5, 1961   H. GRONEMEIER   2,998,651
CUTTING MACHINE FOR CUTTING TEXTILE OR OTHER MATERIAL
Filed Aug. 30, 1955   5 Sheets-Sheet 5

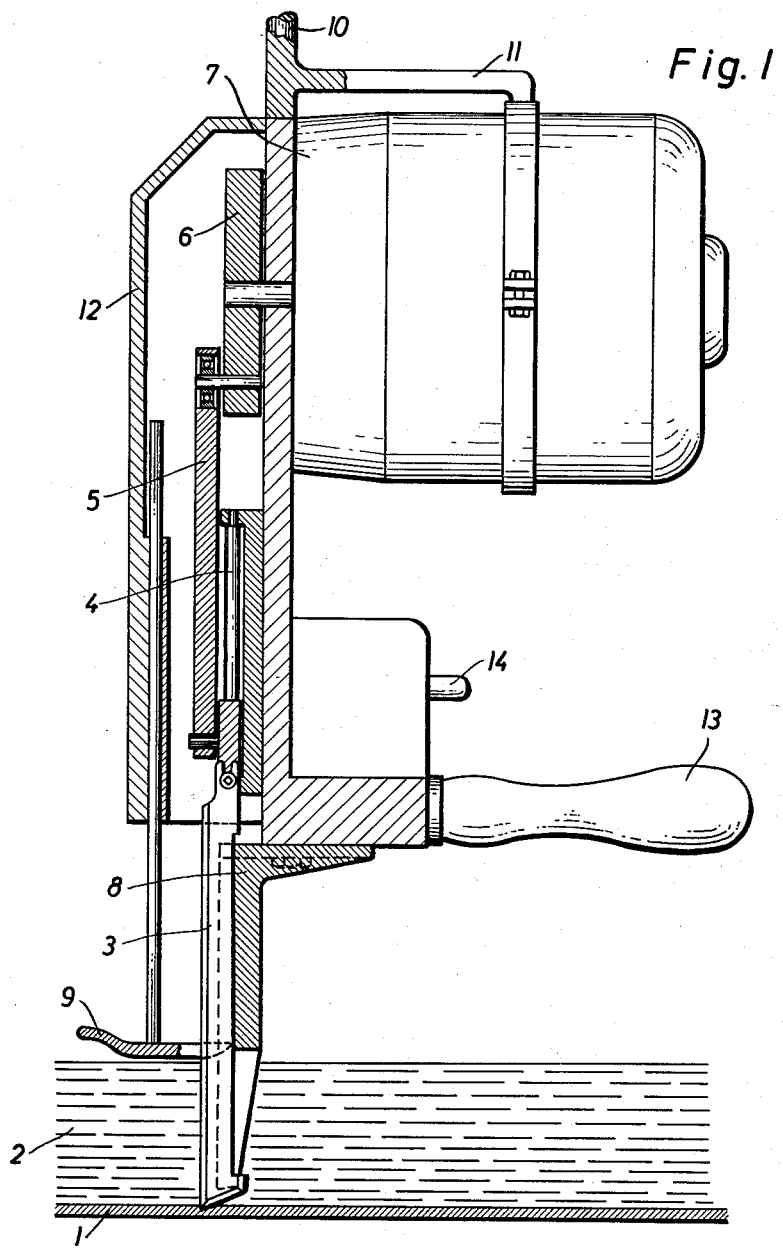
Fig. I
INVENTOR
Heinz Gronemeier
BY
[signature]
Patent Agent.

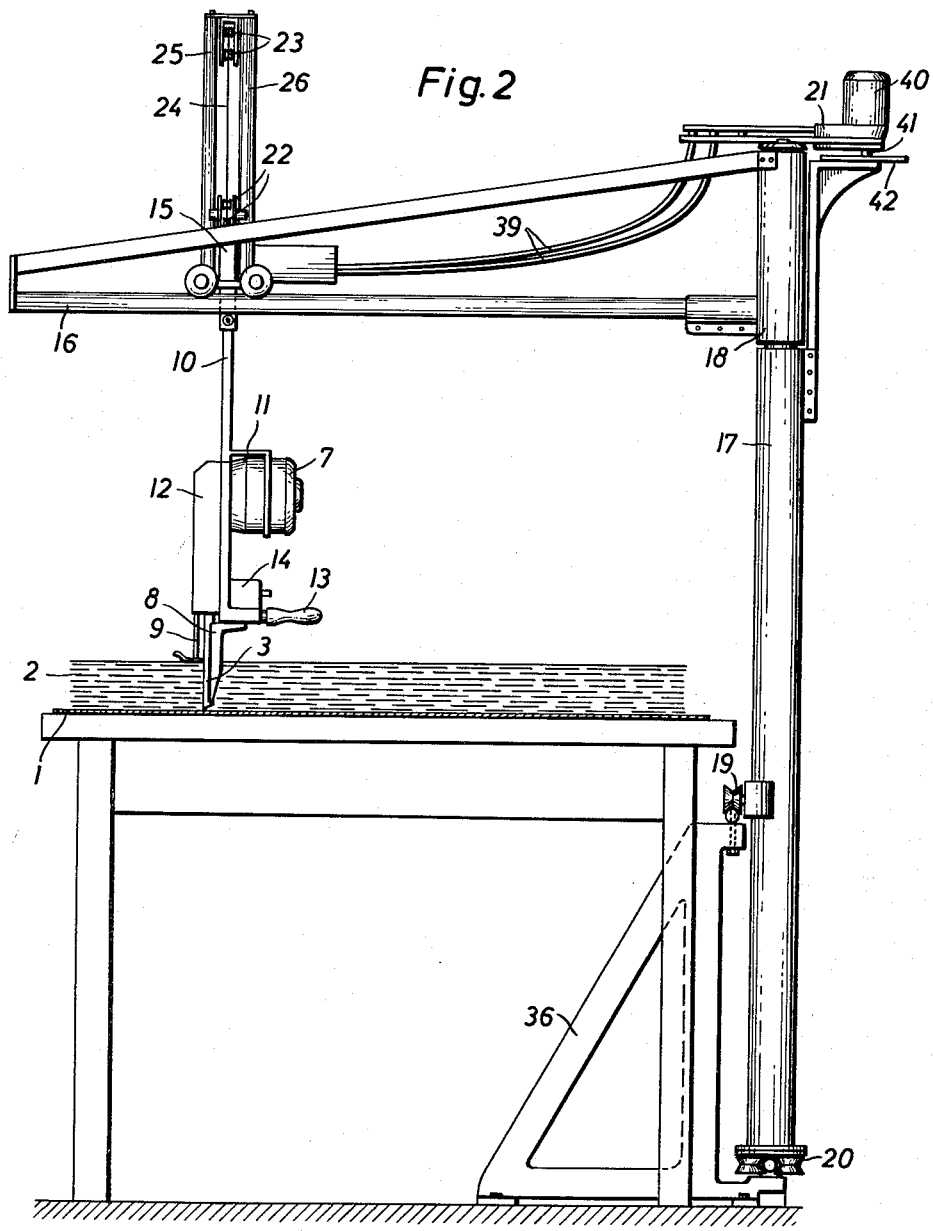

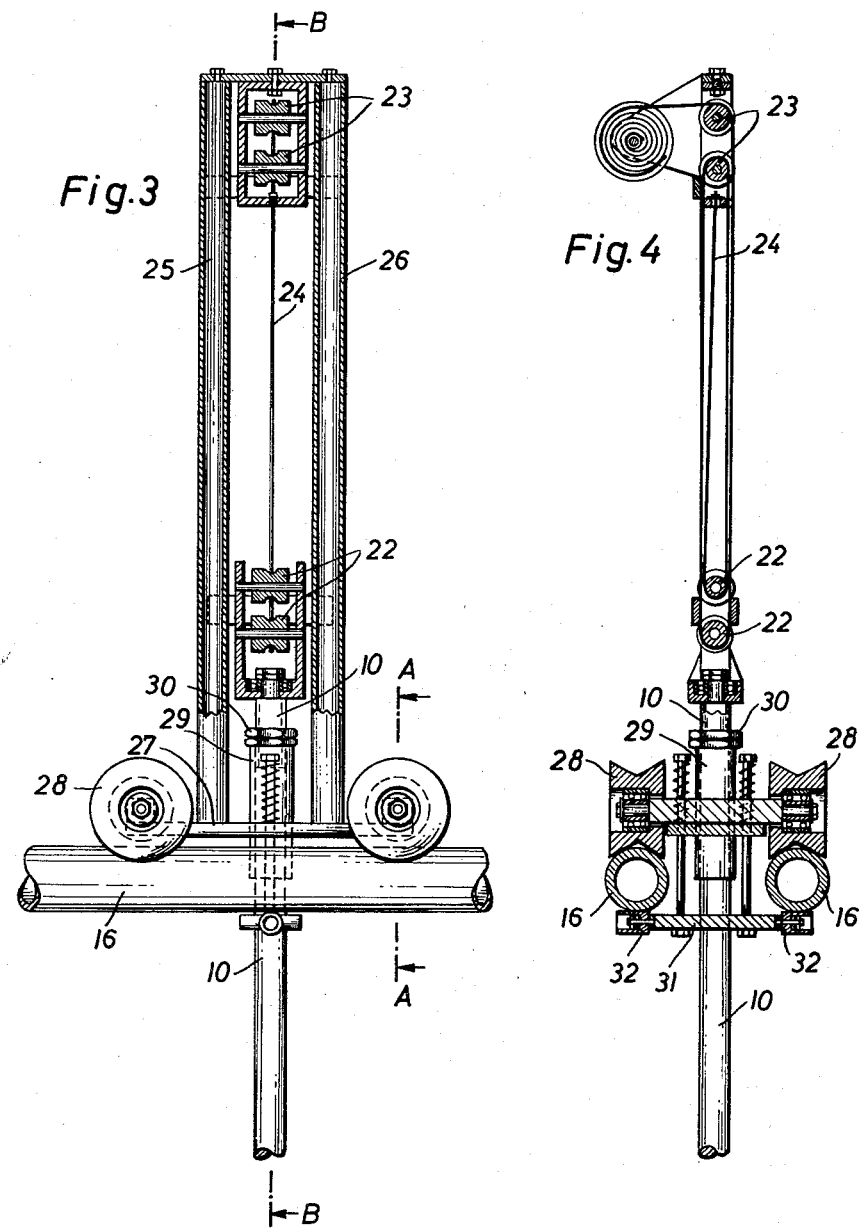

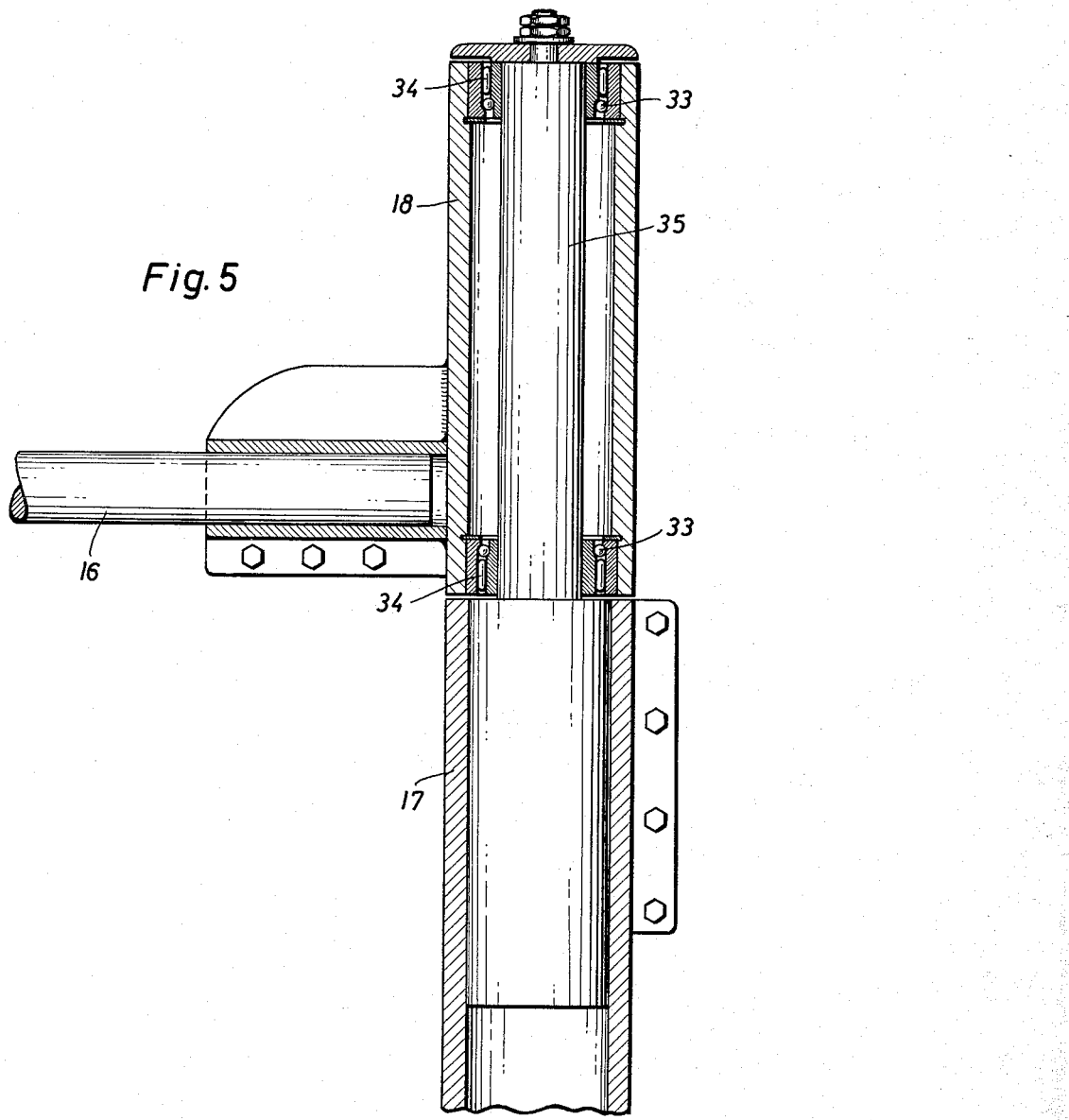

INVENTOR
Heinz Gronemeier
BY
Walter Duhrn
Patent Agent

United States Patent Office 2,998,651
Patented Sept. 5, 1961

2,998,651
CUTTING MACHINE FOR CUTTING TEXTILE OR OTHER MATERIAL
Heinz Gronemeier, Bad Salzuflen, Germany, assignor to Firma Emil Hoogland, Bonn-Nord, Germany
Filed Aug. 30, 1955, Ser. No. 531,370
4 Claims. (Cl. 30—272)

The present invention relates to cutting machines for cutting textile and other materials.

The heretofore known conventional cutting machines of the type involved are provided with a stand supported by roller bearings and supporting a cutter, said stand during a cutting operation sliding underneath the material to be cut. By lifting the layer of textile or other material by the stand of the cutter when it is moved underneath the layer, the layer is displaced, and a faulty cut frequently ensues.

Therefore, the principal object of the present invention consists in the provision of a cutting machine which will overcome the above mentioned drawbacks.

In accordance with the present invention, the cutting machine comprising a work table and a cutter has its cutter suspended from a vertical shaft which in its turn is suspended from a horizontal girder one end of which is connected to a shaft-like vertical stand. Said vertical shaft or stand is supported by a supporting carriage which in its turn is movable along the axis of the above mentioned horizontal girder. The horizontal girder is supported by the vertical stand and is tiltable about the vertical axis thereof. The cutter is thus held in a position in which its lowest part is closely adjacent to the surface of the work table, however without being supported by the work table, and is movable over the work table in every desired direction. The layer of textile or other material can not be lifted or displaced by the cutter because the cutter has no stand which is sliding underneath said material. The cut will, therefore, be correct and precise.

A further object of the invention consists in so designing the cutter of the cutting machine that it will be movable all over the work-table.

A still further object of the invention is to provide a cutting machine, which allows incisions to be made from above into a layer of textile or other material at any point desired and to cut out profiled pieces out of the middle of the layer.

It is a still further object of the invention to provide a cutting machine for cutting along a pattern.

These and other objects and features of the invention will be more readily understood from the following description in connection with the accompanying drawing, in which FIGURE 1 is a front view of the cutter of the cutting machine according to the invention, with a cross-sectional view of the drive for the knife of the cutter;

FIGURE 2 is a side view of the cutting machine;

FIGURE 3 is a front view of a part of the horizontal girder, of the supporting carriage, and of the vertical shaft from which the cutter is suspended;

FIGURE 4 is a sectional view on lines A—A and B—B of FIGURE 3;

FIGURE 5 is a sectional view of the mounting of the horizontal girder on the vertical stand of the cutting machine;

Figure 7:
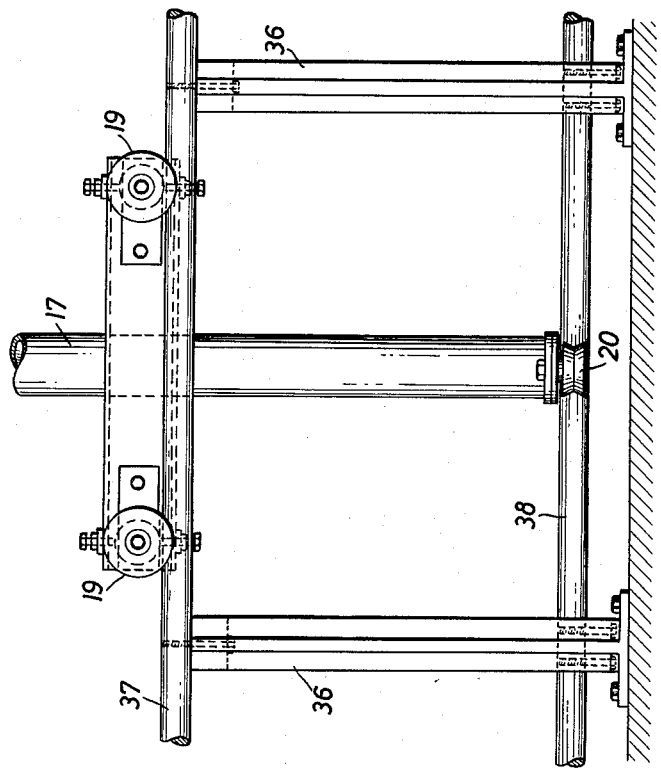
FIGURE 7 is a side view of FIGURE 6, seen from the left side of FIGURE 6.

In the arrangement according to FIG. 1, the work table 1 has placed thereon a layer 2 of textile or similar material which is to be cut by a knife 3. This knife 3 is adapted to be moved upwardly and downwardly by driving means while being guided by guiding means 4, said driving means comprising a connecting rod 5, a crank 6 and an electric motor 7. The knife 3 is precisely guided by a guiding device 8. The layer 2 will be held down by means of a pressure bar 9. The knife 3, the guiding device 8, the pressure bar 9, and the electric motor 7 are supported and guided by the vertical shaft 10, a guard plate 12, and arms 11 respectively, said arms 11 being fixedly connected to said shaft 10. Thus, the entire cutter is suspended from the vertical shaft 10. A handle 13 is fastened to the vertical shaft 10 of the cutter. Adjacent the handle 13 there is provided a switch 14 for controlling the electric motor 7.

The vertical shaft 10 is in its turn suspended from the supporting carriage 15 (FIG. 2) carried by a horizontal girder 16 and movable thereon. As shown in FIG. 2, the horizontal girder 16 is linked to the vertical shaft-like stand 17 by means of a socket 18 so that it can be turned about the stand 17. The vertical stand 17 is supported by a supporting structure 36 (FIGS. 2, 6 and 7), and is movable thereon alongside the work table 1 by means of rollers 19 and 20. The cutting machine can work automatically by means of the pantograph system 21 controlling the movements of the cutter according to an insert pattern or templets.

The vertical shaft 10 is supported by a spring suspended set of pulleys 22 and 23 (FIGS. 3 and 4) in cooperation with a rope 24 and a stand including the shafts 25 and 26 supported by the supporting carriage 15.

FIG. 2 furthermore shows a Bowden wire 39, an electric motor 40, and a sensing pin 41 which moves around the respective templates.

FIGS. 3 and 4 also show the supporting carriage 15 as being movable upon a horizontal girder that comprises two tubular members 16 which are parallel to each other and extend in a horizontal plane. The supporting carriage 15 comprises a plate 27 and rollers 28 rotatably supported thereby. Each of the two tubular members 16 of the horizontal girder has two rollers 28 associated therewith. A socket member 29 is mounted in upright position on the supporting carriage, and the vertical shaft 10 is guided within said socket member 29. An adjustable catch 30 or abutment is arranged on that part of the vertical shaft 10 which is above the supporting carriage. The vertical shaft 10 is movable in the socket member 29. The downward movement of the vertical shaft 10 is limited by the adjustable catch 30. A spring-suspended plate 31 with rollers 32 is held against the shafts of the girder 16 from the side opposite to the rollers 28 of the supporting carriage. The plate 31 is spring-suspended from the plate 27 of the supporting carriage.

FIG. 5 shows a part of the horizontal girder 16 mounted on the vertical stand 17 by means of the socket 18. The socket 18 comprises thrust bearings 33 for supporting the horizontal girder 16 and roller bearings 34 to allow turning of the horizontal girder 16 around the shaft or column 35 of the vertical stand 17.

Figure 6:
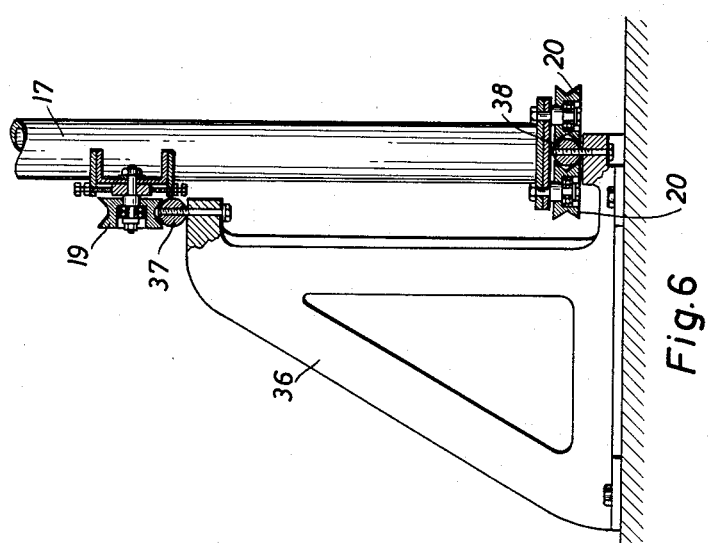
FIGURE 6 is a front view of the lower part of the vertical stand and shows how it is movable on its supporting structure.

FIGS. 6 and 7 show the lower portion of the vertical stand 17 and its supporting structure 36. Rails 37 and 38 are fastened to the supporting structure 36, and rollers 19 and 20 mounted on the vertical stand 17 are adapted to roll upon and along said rails 37 and 38.

Since the cutting machine does not require any base which slides underneath the layer of the material to be cut as is necessary with the conventional cutting machines of the type involved, the layers can be clamped on the table in order to prevent the material from moving or being displaced. Underneath the layer may preferably be used a felt layer. The clamping may be done by cloth pins or the like. The cutter, suspended from the vertical stand, can be made either mobile or stationary. If made stationary, the vertical stand is to be fixed to the floor or to the table, and if mobile, to an additional supporting structure or to the work-table. The mobile cutter should be fixed to the work-table in any desired position by a brake. The brake will be attached preferably to the bearing carriage.

Because of the suspension according to this invention, the guiding of the cutter is very simple, so that the operator does not tire easily. The machine allows movement of the cutter in all directions over the whole table without any difficulty.

The machine can also be turned to the side, so that the table is completely free. The main advantage of the new device consists in that incisions can be made from above at any point desired. Lifting the machine, its weight is more or less counter-balanced by the suspension of this invention. As the incisions can be made from above, the patterns can be placed very close to each other, thereby doing away with wastage of material. Compared with the cutting machine according to the invention, the conventional machines with a stand, which slides underneath the layer, are intended to cut into the material from the side.

If a pattern is to be used for cutting along the pattern, the pattern should be fitted underneath the pressure bar of the cutter.

The whole cutter unit can be fixed to the ceiling either stationarily or in a mobile manner, as well as to the floor or to the work-table.

What I claim is:

1. In combination in a cutting machine for cutting textile and similar material to pattern; a cutting table for supporting the material to be cut, supporting means resting outside the material supporting surface of said table and provided with two vertically spaced runways extending in longitudinal direction of and near one longitudinal edge of said table, an upright column, roller means supported by said column and arranged for movement on said runways to thereby guide said column along said runways, a cantilever supported by and linked to said upright column so as to be turnable about the axis of said column, said cantilever being provided with a runway, a carriage movably mounted on said runway, a frame supported by said carriage, a vertical shaft vertically adjustably supported by said frame and rotatable relative thereto, block and tackle means connected between said frame and said vertical shaft and spring biased to support said vertical shaft, adjustable abutment means connected to said vertical shaft above said carriage for limiting the downward movement of said shaft, and cutting means supported by said vertical shaft for cutting material on said table.

2. In combination in a cutting machine for cutting textile and similar material to pattern: a cutting table for supporting the material to be cut, supporting means resting outside the material supporting surface of said table and provided with two vertically spaced runways extending in longitudinal direction of and near one longitudinal edge of said table and parallel with said longitudinal edge of the table, an upright column, roller means supported by said column and arranged for movement on said runways to thereby guide said column along said runways, a cantilever supported by and linked to said upright column so as to be turnable about the axis of said column, said cantilever being provided with a horizontal runway comprising two horizontal bars parallel and in spaced relationship to each other, a carriage provided with two pairs of rollers movable on and guided by said bars, a frame supported by said carriage, a vertical shaft vertically adjustably guided in said frame and rotatable relative thereto, adjustable abutment means connected to said vertical shaft above said carriage for limiting the downward movement of said shaft, cutting means supported by said vertical shaft for cutting material on said table, and a spring tensioned block and tackle system connected between said shaft and said frame yieldably supporting said shaft and cutting means in said frame.

3. In combination in a cutting machine for cutting textile and similar material to pattern: a cutting table for supporting the material to be cut, supporting means resting outside the material supporting surface of said table and provided with two vertically spaced runways extending in longitudinal direction of and near one longitudinal edge of said table, an upright column, roller means supported by said column and arranged for movement on said runways to thereby guide said column along said runways, a cantilever supported by and linked to said upright column so as to be turnable about said column, said cantilever being provided with a runway, a carriage movably mounted on said runway, spring means supported by said carriage, a vertical shaft suspended from said spring means, adjustable abutment means connected to said vertical shaft above said carriage for limiting the downward movement of said shaft, and cutting means supported by said vertical shaft for cutting material on said table, the major portion of the weight of said vertical shaft and said cutting means being supported by said spring means.

4. The combination according to claim 3 wherein said runways of said supporting means are parallel with the said longitudinal edge of the table.

References Cited in the file of this patent

UNITED STATES PATENTS

| | | |
|---|---|---|
| 151,456 | Warth | May 26, 1874 |
| 429,526 | Hughes | June 3, 1890 |
| 562,005 | Law | June 16, 1896 |
| 880,059 | Wilt | Feb. 25, 1908 |
| 1,103,364 | Laub | July 14, 1914 |
| 1,546,934 | Levin | July 21, 1925 |
| 1,585,012 | Biersdorf | May 18, 1926 |
| 1,586,027 | Campbell | May 25, 1926 |
| 1,663,267 | Colby | Mar. 20, 1928 |
| 1,734,523 | Klausmeyer | Nov. 5, 1929 |
| 1,815,037 | DeWalt | July 21, 1931 |
| 2,283,346 | Bucknam | May 19, 1942 |
| 2,562,892 | Cowan | Aug. 7, 1951 |
| 2,565,169 | Compton | Aug. 21, 1951 |
| 2,691,417 | Piller | Oct. 12, 1954 |
| 2,699,606 | Breau | Jan. 18, 1955 |